United States Patent [19]

Maiocco

[11] 4,336,625
[45] Jun. 29, 1982

[54] WIPER BLADE
[75] Inventor: Guiseppe Maiocco, Rivoli, Italy
[73] Assignee: ARMAN S.p.A., Turin, Italy
[21] Appl. No.: 133,274
[22] Filed: Mar. 24, 1980
[30] Foreign Application Priority Data
  Mar. 23, 1979 [IT] Italy .................. 67608 A/79
[51] Int. Cl.³ .............................................. B60S 1/04
[52] U.S. Cl. .................................................. 15/250.42
[58] Field of Search ...................... 15/250.32–250.42
[56] References Cited
U.S. PATENT DOCUMENTS

| 2,767,419 | 10/1956 | Horton | 15/250.42 |
| 2,901,761 | 9/1959 | Wallis . | |
| 2,920,335 | 1/1960 | Ryck | 15/250.42 |
| 3,192,551 | 7/1965 | Appel | 15/250.36 |
| 3,317,945 | 5/1967 | Ludwig . | |

FOREIGN PATENT DOCUMENTS 1050709 9/1953 France .................. 15/250.42

Primary Examiner—Peter Feldman
Attorney, Agent, or Firm—Wegner, McCord, Wood & Dalton

[57] ABSTRACT

Several different configurations of the superstructure of a wiper blade are provided for use with a novel backing strip for a wiping element. The backing strip has two spaced apart backing elements which are joined at the ends and at at least one portion intermediate the ends. The joined intermediate portion or portions have reduced flexibility and are deformed toward or away from the surface to be wiped. When the deformation of the joined intermediate portion is away from the surface to be wiped, one end of one element of each superstructure applies pressure thereto to force the wiping element into wiping contact with the surface to be wiped. When the deformation of a joined intermediate portion is toward the surface to be wiped, the ends of one element of the superstructure contacts the backing strip at points equally spaced from said joined portion to force the wiping element into wiping contact with the surface to be wiped.

3 Claims, 5 Drawing Figures

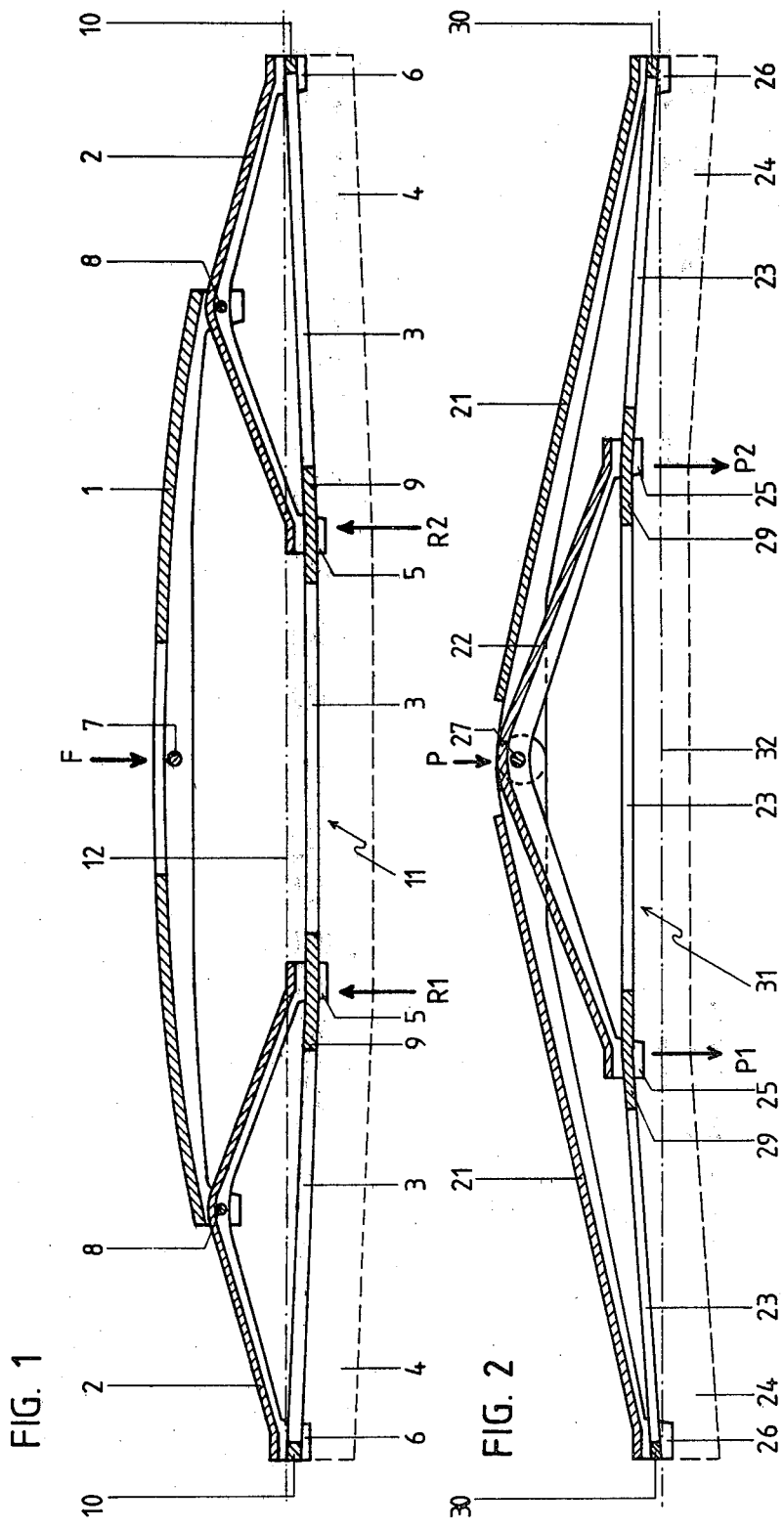

WIPER BLADE

BACKGROUND OF THE INVENTION

1. Field of the Invention

The present invention relates generally to wiper systems and, more particularly, to wiper systems used on motor vehicles for cleaning the windshields, rear windows and headlights.

2. Description of the Prior Art

Wiper systems basically comprise a wiper arm to which is attached a wiper blade including a superstructure or holder linked, by means of several claws, to a resilient wiping element or squeegee through intermediate backing strips located in lateral recesses provided in the wiping element.

Any wiper blade manufacturer has to solve a certain number of technical problems which first depend on the general form and on the dimensions of the surfaces to be cleaned and, second, depend on the specific qualities that the manufacturer wishes to give to his wiper blades.

Among the qualities a wiper blade should have, the following may be cited:

substantially uniform pressure distribution all along the wiping element on flat surfaces as well as on curved surfaces;

good anti-wind properties, i.e. the wiper blades should resist the action of the wind which tends to lift the wiper blade from the surface to be cleaned;

low production costs, for example in developing a wiper blade comprising the least possible parts.

Up to now most backing strips were flat, straight blades to which, before assembly, a certain curvature was superimposed. Other known backing strips have a flexibility diminishing continuously or discontinuously from their two extremities towards the center of the strips. This diminishing flexibility is generally obtained in increasing the transverse cross section of the backing strips.

SUMMARY OF THE INVENTION

More particularly, the present invention relates to a wiper blade having characteristics such that the above-mentioned qualities are best taken into consideration for the cleaning of plane or slightly curved surfaces. Indeed there are on the market wiper blades which, by their special construction, are better adapted to very curved surfaces.

A first object of the invention is, therefore, to provide a wiper blade guaranteeing a uniform distribution of the pressure of the wiper arm all along the surface to be cleaned.

A second object of the invention is to provide a wiper blade having good anti-wind properties, more especially in keeping the height of the wiper blade as small as possible.

A third object of the invention is to provide a wiper blade of which the production costs are very low when compared to other types of wiper blades.

The main feature of the invention is a new form of backing strip.

Contrary to the known wiper blades, the wiper blade according to the invention is characterized in that the backing strips change one or several times their angular direction in all longitudinal cross sections perpendicular to the surface to be cleaned.

In a first and a second embodiment of the invention, the angular change or changes of direction of the backing strips give to said strips a form substantially either convex or concave with respect to the surface to be cleaned.

In a third embodiment of the invention, the angular changes of direction of the backing strip gives to said strip a form substantially similar to an inverted and flattened W.

In the two first embodiments of the invention, which as a matter of fact are an adaptation of the invention to already known superstructures, the backing strips will have a lower flexibility at the sections where there is an angular change of direction, these sections, by the way, correspond to the sections where the claws of the superstructure link said superstructure to the backing strips and to the squeegee, except for the two claws at the extremities of the superstructure where there is neither an angular change of direction, nor necessarily a lower flexibility of the backing strips.

Principally, the general form of the backing strips will be convex towards the surface to be cleaned when the pressure of the wiper arm is directly transmitted to the two extremities of the wiper blade, either by a single and unique main bridge, or by a main bridge and secondary yokes. On the contrary, the general form of the backing strip will be concave towards the surface to be cleaned when the pressure of the wiper arm is not directly transmitted to the two extremities of the wiper blade.

As already said above, the two first embodiments of the invention are only an adaptation of the invention to already known superstructures. This, however, is not the case for the third embodiment of the invention, said third embodiment being based on an entirely new concept of the whole wiper blade. Indeed, the general form of the backing strips, similar to an inverted and flattened W, makes it possible to suppress all the secondary yokes and to maintain only a single and unique main bridge with substantially reduced dimensions since its claws will grip the backing strips at the two top angles of the inverted W. These two angles are positioned at a rather long distance from the two extremities of the wiper blade.

Whilst the main advantage of the two first embodiments of the invention is a very good pressure distribution all along the wiper blade, the third embodiment of the invention has all the qualities mentioned above, i.e. a very good pressure distribution on flat or slightly curved surfaces, very good anti-wind properties and above all very low production costs for a quality blade which, moreover, may easily be hidden beneath the hood of the vehicle because of its very small height, more especially if the blade is provided with a fitting for a lateral attachment to the wiper arm.

BRIEF DESCRIPTION OF THE DRAWINGS

Other characteristics and advantages of the invention will be more fully understood when reading the following portions of the specification in conjunction with the accompanying drawings wherein:

FIG. 1 is a longitudinal sectional view of a wiper blade according to the first embodiment of the invention;

FIG. 2 is a longitudinal sectional view of a wiper blade according to the second embodiment of the invention;

DESCRIPTION OF THE PREFERRED EMBODIMENT

Figure 3:
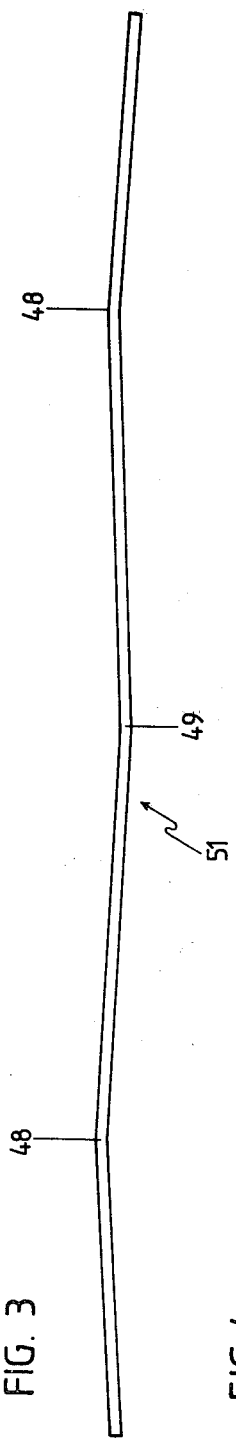
FIG. 3 is a side elevational view of the backing strips according to the third embodiment of the invention.

FIG. 1 shows one of the possible constructions of the first embodiment of the invention, i.e. the embodiment wherein the general form of the backing strip 11 is convex towards the surface to be cleaned. In the center portion of the wiper blade, said backing strip 11 is positioned beneath the horizontal line 12 when the wiper blade is free, i.e. not in contact with the surface to be cleaned.

The wiper blade of FIG. 1 essentially comprises a main bridge 1, a secondary yokes 2, two backing strip 11 and a resilient wiping element or squeegee 4. The secondary yokes 2 are provided with interior claws 5 and with exterior claws 6 which grip the backing strip 11, said backing strip 11 being positioned in longitudinal grooves (not shown) provided in the resilient squeegee 4.

The backing strip is separated by a slot 3, but it is secured, one to the other, at their two extremities 10 as well as at the sections R1 and R2 where there is an angular change of direction of the backing strip. At these same sections R1 and R2, the interior claws 5 grip said backing strip 11 and consequently link them, as well as the squeegee 4, to the superstructure of the wiper blade.

The webs or bridges 9, which secure one side to the other of the backing strip 11 at the sections R1 and R2, diminish the flexibility of the strip 11 at said two sections R1 and R2. It is, however, quite evident that this diminished flexibility may be obtained by other means, such as for example by a larger width or thickness of the backing strips 11 or by an appropriate transverse deformation of said strip 11. Furthermore, the flexibility of the backing strip 11 may regularly increase from the sections R1 and R2 towards the respective extremities 10 of the wiper blade.

The pressure F of the wiper arm (not shown) is transmitted to the backing strip 11 by the following parts: the pivot pin 7, the main bridge 1, the pivots 8, the secondary yokes 2 and the claws 5 and 6. When the wiper blade is placed on a flat or a curved surface, the secondary yokes 2 rotate because of the reacting forces R1 and R2 and the backing strip 11, and consequently the wiping element or squeegee 4, adapt themselves to the form of the surface to be cleaned. Because of the angular change of direction of the backing strip 11 at the sections R1 and R2 and because of the fact that at these same sections said backing strip 11 has a lower flexibility, the transfer of the pressure F of the wiper arm is more important in the central portion of the wiper blade as this would be in a wiper blade provided with a conventional backing strip. It is, however, evident that a uniformly distributed pressure all along the wiping element or squeegee 4 can only be obtained by judiciously choosing not only the form and the flexibility of the backing strips 11, but also the dimensions of the main bridge 1 and of the secondary yokes 2.

The wiper blade shown in FIG. 1 is only one of the possibilities for using the principle of the invention in which the general form of the backing strip 11 is convex towards the surface to be cleaned. Without going into details, one may cite the following examples:

a wiper blade comprising more than two secondary yokes or also comprising intermediate bridges and/or intermediate yokes. In this case there will be as many angular changes of direction as there are interior claws;

a wiper blade comprising one single and unique bridge which transmits the pressure of the wiper blade directly to the two extremities of the wiper blade and wherein the secondary yokes are, for example, replaced by leaf springs comprising one or two limbs.

FIG. 2 shows one of the possible constructions of the second embodiment of the invention, i.e. wherein the general form of the backing strip 31 is concave towards the surface to be cleaned. In the center portion of this wiper blade, said backing strip is thus positioned above the horizontal line 32 when the wiper blade is free, i.e. when it is not in contact with the surface to be cleaned.

The backing strip 31 is exactly similar to the backing strip 11 of FIG. 1 and all what has been said on the backing strip 11 is also true for the backing strip 31, the only difference being that in FIG. 1, the backing strip is mounted onto the superstructure of the wiper blade in such a way that they are convex towards the surface to be cleaned, whilst in FIG. 2 it is mounted on the superstructure of the wiper blade so as to be convex towards said superstructure of the wiper blade.

The superstructure of the wiper blade of FIG. 2 comprises a bridge 21 in two parts, rotatable around the pivot pin 27, and a central yoke 22 in one piece, also rotatable around the pivot pin 27. In this embodiment, the pressure P of the wiper arm (not shown) is transmitted to the backing strip 31 through the central yoke 22 and the claws 25. The backing strip 31 is separated by slots 23 extending from the two extremities 30 to the portions 29 of lower flexibility. A slot 23 also extends between the two portions 29. Under the pressure of the forces P1 and P2 thus transmitted to the backing strips 31, said strips, and consequently the resilient squeegee 24, adapt themselves to the surface to be cleaned, said surface being plane or curved.

It is to be noted that contrary to some known wiper blades, the wiper blade of FIG. 2 is not provided with a coil spring surrounding the pivot pin 27, which spring in these types of wiper blades urges downwards the claws 26 on the remote ends of the two parts of the bridge 21. However, the invention may also be adapted to wiper blades which are provided with such a coil spring.

In the embodiment shown in FIG. 2, the conformation of the backing strip 31 to the configuration of the surface to be cleaned is due to the action of the forces P1 and P2 and thanks to the special form as well as, above all, to the portions of lower flexibility 29 when transmit an important part of the forces P1 and P2 towards the two extremities 30 of the wiper blade. However, just as in the embodiment of FIG. 1, the actual distribution of the pressure all along the squeegee 24 depends on the form and the dimensions not only of the central yoke 22, but also on the form and the variable flexibility of the backing strip 31.

Just as in the first embodiment, the wiper blade shown in FIG. 2 is only one of the possibilities to use the principle of the invention wherein the general form of the backing strip 31 is concave towards the surface to be cleaned. The following examples may be cited:

a wiper blade comprising not only a single central yoke, but an intermediate yoke and a secondary yoke, the intermediate yoke being linked on one of its extremities to the backing strip and on the other of its extremities to the secondary yoke. In this embodiment there will be three angular changes of direction of the backing strip and consequently also three portions of lower flexibility;

a wiper blade comprising a superstructure which is reduced to a connecting device, for the wiper arm, rigidly secured to the backing strip. In this embodiment there will be only one change of the direction of the backing strip and only one portion of lower flexibility. The change of direction and the portion of lower flexibility will be positioned at the section corresponding to said connecting device.

Figure 4:
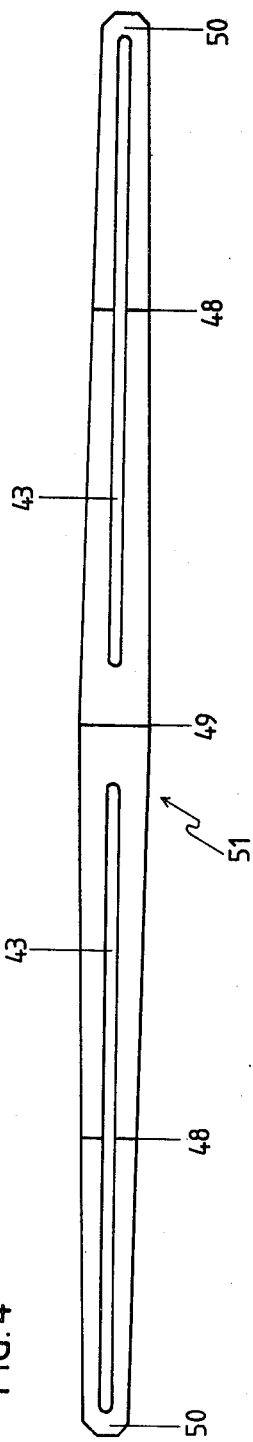
FIG. 4 is a top view of the backing strips of FIG. 3.
Figure 5:
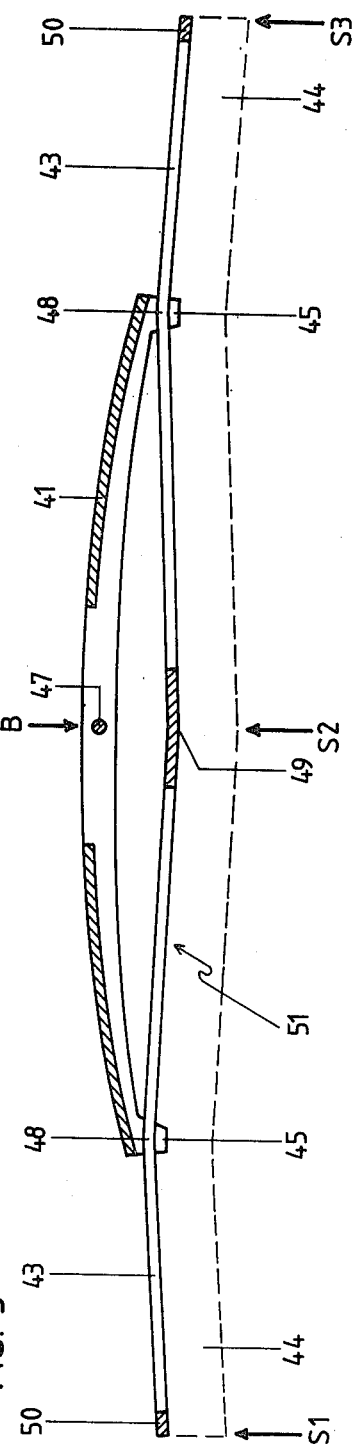
FIG. 5 is a longitudinal sectional view of the wiper blade according to the third embodiment of the invention.

FIGS. 3 to 5 show the third embodiment of the invention wherein the general form of the backing strip 51 substantially corresponds to the form of an inverted and flattened W with a bottom angle 49 and two top angles 48 (FIG. 3). The backing strip 51 is linked together at their two extremities 50 and at their center portion 49, i.e. at the section where there is an angular change of direction (FIG. 4). Just as in the two preceding embodiments, the backing strip 51 is separated by slots 43 and the center portion or link 49 between the backing strip corresponds to a portion having a lower flexibility which may also be obtained by other means such as disclosed with respect to the embodiment corresponding to FIG. 1. Lastly, the width of the backing strip 51 increases from their two extremities 50 towards their center portion 49, the effect of this being a still lower flexibility near the center of the backing strip.

FIG. 5 shows the complete wiper blade according to the third embodiment of the invention. The pressure B of the wiper arm (not shown) is transmitted to the backing strip 51, and consequently to the resilient squeegee 44, by the pivot pin 47, the sole bridge 41 and the claws 45 of said bridge. As already said above, the two claws 45 of the sole bridge 41 grip the backing strip at the two upper angles 48.

When the wiper blade of this embodiment is placed on a flat surface, the first contacts of the squeegee 44 with the surface to be cleaned will be at the sections S1, S2 and S3. Under the pressure B of the wiper arm, which is transmitted to the backing strip 51 through the claws 45, said backing strip 51 flatten and the resilient squeegee 44 is uniformly pressed against said plane surface.

When the same wiper blade is placed on a curved surface, the first contact will be at the section S2 and because of the reacting force at S2, the two portions of the backing strip 51, on both sides of section S2, will slightly rotate around the two upper angles 48 corresponding to the claws 45 of the sole and unique bridge 41. Consequently the two extremities 50 of said backing strip 51 will move downwards with respect to the bridge 41 and they will be pressed against the curved surface to be cleaned.

Thus, a wiper blade has been provided which is very economical and of a very small height and which independently of the advantages resulting therefrom, also provides a uniformly distributed pressure all along a plane or a curved surface to be cleaned.

It will be understood that the invention is not limited to the exact constructions shown and described, but that various changes and/or modifications may be made without departing from the spirit and scope of the invention as defined in the appended claims.

I claim:

1. A wiper blade comprising a superstructure, a resilient wiping element and a backing strip, said backing strip having two sides embedded in two longitudinal, lateral grooves in said resilient wiping element, characterized in that said backing strip (51) changes angular direction in a plane perpendicular to the surface to be cleaned, said backing strip changes angular direction three times in such a way that the general form of the strip (51) is substantially similar to the form of an inverted and flattened W, the flexibility of said backing strip (51) diminishes in a continuous manner from its two extremities (50) to its center portion (49), and said superstructure comprises a single bridge (41) provided with claws (45), said claws gripping the backing strip (51) at the two high points of the inverted W.

2. A wiper blade according to claim 1, characterized in that said bridge (41) and the backing strip (51) are symmetrical with respect to a transverse plane passing through the center (49) of the wiper blade.

3. A wiper blade according to claim 1, characterized in that lower flexibility of the backing strip (51) is obtained by an increase in the width of the strip and by an appropriate deformation of the transverse cross section.

* * * * *